United States Patent
Park

(10) Patent No.: US 7,979,708 B2
(45) Date of Patent: Jul. 12, 2011

(54) DIGITAL RIGHTS MANAGEMENT

(75) Inventor: Kwang Cheol Park, Seoul (KR)

(73) Assignee: LG Electronics Inc., Seoul (KR)

( * ) Notice: Subject to any disclaimer, the term of this patent is extended or adjusted under 35 U.S.C. 154(b) by 1039 days.

(21) Appl. No.: 11/320,108

(22) Filed: Dec. 27, 2005

(65) Prior Publication Data

US 2006/0143461 A1 Jun. 29, 2006

(30) Foreign Application Priority Data

Dec. 27, 2004 (KR) .................. 10-2004-0113241

(51) Int. Cl.
*H04L 9/32* (2006.01)
(52) U.S. Cl. ........................................ 713/176; 380/270
(58) Field of Classification Search .................. 713/176, 713/161, 170; 705/54, 53, 901–902, 908, 705/911–912; 380/270, 286
See application file for complete search history.

(56) References Cited

U.S. PATENT DOCUMENTS

| | | | |
|---|---|---|---|
| 6,789,192 B2 * | 9/2004 | Hirota et al. ................... | 713/172 |
| 7,511,859 B2 * | 3/2009 | Lim .............................. | 358/3.28 |
| 7,685,643 B2 * | 3/2010 | Lee et al. ........................ | 726/27 |
| 2002/0065743 A1 * | 5/2002 | Bates et al. ..................... | 705/27 |
| 2003/0115454 A1 * | 6/2003 | Piikivi et al. ................... | 713/155 |
| 2003/0221113 A1 * | 11/2003 | Kupka et al. ................... | 713/189 |
| 2003/0232615 A1 * | 12/2003 | Kim et al. ...................... | 455/405 |
| 2004/0098592 A1 * | 5/2004 | Taki ............................... | 713/176 |
| 2004/0153767 A1 * | 8/2004 | Dolgonos ........................ | 714/18 |
| 2004/0158712 A1 * | 8/2004 | Lee et al. ........................ | 713/165 |
| 2004/0253942 A1 * | 12/2004 | Mowry et al. .................. | 455/410 |
| 2005/0021539 A1 * | 1/2005 | Short et al. ..................... | 707/100 |
| 2005/0086313 A1 * | 4/2005 | Lucas et al. .................... | 709/206 |
| 2005/0197099 A1 * | 9/2005 | Nehushtan ..................... | 455/410 |
| 2005/0246282 A1 * | 11/2005 | Naslund et al. ................. | 705/52 |
| 2006/0135161 A1 * | 6/2006 | Jiang et al. ..................... | 455/436 |
| 2009/0296657 A1 * | 12/2009 | Omar et al. .................... | 370/331 |

FOREIGN PATENT DOCUMENTS

| | | |
|---|---|---|
| KR | 1020020095726 | 12/2002 |
| KR | 1020020096689 | 12/2002 |
| KR | 1020040028086 | 4/2004 |
| KR | 1020040084483 | 10/2004 |
| WO | WO 03/034428 | 4/2003 |

\* cited by examiner

*Primary Examiner* — Matthew B Smithers
*Assistant Examiner* — Abu Sholeman
(74) *Attorney, Agent, or Firm* — Lee, Hong, Degerman, Kang & Waimey

(57) ABSTRACT

A digital rights management is provided. In the digital rights management method and contents service method, a user terminal of the digital contents encodes the digital contents based on specific information of the terminal. When using the digital contents encoded based on the identification of the terminal, the digital contents are decoded using the identification of the corresponding terminal. A billing is performed with respect to the use of the digital contents encoded or decoded based on the identification of the terminal.

8 Claims, 3 Drawing Sheets

S10: ENCODE CONTENTS FOR DRM AND REGISTER ENCODED CONTENTS

S20: DOWNLOAD CONTENTS

S30: REPLAYING CONTENTS USING DRM DECODER

DIGITAL RIGHTS MANAGEMENT

BACKGROUND OF THE INVENTION

This application claims the benefit of the Korean Patent Application Nos. 10-2004-0113241, filed on Dec. 27, 2004, which is hereby incorporated by reference herein in their entirety.

1. Field of the Invention

The present invention relates to a digital rights management.

2. Description of the Related Art

In order to manage the use of digital contents, a digital rights management (DRM) has been developed. The use of the digital contents is protected using the DRAM technology. The use of the digital contents means available number and combination of the digital contents, whether to allow duplication (movement) of the digital contents, and number of allowable duplication (movement), as well as the storing, copying, moving and playing the digital contents.

The DRM has been developed for securing safe distribution of the digital contents and prevent illegitimate use, copy and distribution. Also, the DRM technology has been developed for protecting on-line contents of the commercially available products that are rapidly increased due to the wide-range use of file exchange programs between users. Although the on-line products are protected by the copyright law, it is practically difficult to regulate the illegitimate use of the contents and the offenders. Therefore, the DRM technology is based on the encoding of contents so as to prevent the illegitimate use of the contents.

FIG. 1 is a view illustrating a digital contents service and digital rights management method in a related art mobile terminal.

A contents provider encodes in advance the contents in an appropriate way for the purpose of DRM and registers them in a content server 10 (S10). The user accesses the corresponding contents server 10 through a mobile terminal 20, and downloads desired contents (S20). The contents downloaded in the mobile terminal 20 are decoded according to a user's replaying request and then are replayed (S30).

The related art digital contents service method has to manage the original digital contents that are not encodes together with the previously encoded digital contents. Since the digital contents that are encoded together with the original digital contents have to be managed in the contents provider and contents server together, a burden of a system for the digital rights management increases.

The related art DRM technology is dependent on the digital contents and is not dependent on the user's authenticity. For example, even though the DRM is locked with respect to the digital contents and a first terminal legitimately acquires the digital contents, if the contents are copied or moved from the first terminal to a second terminal without permission, there is a strong probability that the second terminal will use the digital contents without any disturbance. This is because the DRM is dependent on the digital contents. That is, strictly speaking, since the DRM is not dependent on the user, it is practically difficult to recognize the fact that the user (terminal) is changed.

That is, the related art digital rights management technology has the following drawbacks. Since the related art digital contents service method uses the same encryption key with respect to the same contents, if the digital contents downloaded to the user terminal are copied/moved to other terminals to which the use of the digital contents are not permitted, the copied/moved digital contents can be decoded in other terminals by the encryption key. Consequently, the illegitimate use of the digital contents is possible.

SUMMARY OF THE INVENTION

Accordingly, the present invention is directed to a digital rights management that substantially obviates one or more problems due to limitations and disadvantages of the related art.

An object of the present invention is to provide a digital rights management that can strongly regulate the illegitimate use of the digital contents.

Another object of the present invention is to provide an improved digital contents management in which the contents are encoded based on specific information of the terminal and the encoded contents can be used based on the specific information of the terminal.

A further another object of the present invention is to provide a digital contents management method, in which the digital contents can be used more safely and a proper billing can be achieved based on the use of the digital contents.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, there is provided a digital rights management method including: providing digital contents from a digital contents server to a terminal; encoding the provided digital contents using an identification of the terminal; and decoding the digital contents using the identification of the terminal, when the encoded digital contents are used.

In another aspect of the present invention, there is provided a digital rights management method including: providing identification of a terminal from a terminal to a digital contents server; encoding digital contents to be provided from the digital contents server by using the provided identification of the terminal; providing the encoded digital contents to the terminal requesting the corresponding contents; and decoding the digital contents by using the identification of the terminal, when the terminal uses the encoded digital contents.

In a further another aspect of the present invention, there is provided a digital contents service method including: encoding digital contents using an identification of a terminal and storing the encoded digital contents; and performing, at the terminal, a billing operation with respect to use of the encoded and stored digital contents based on a communication with a billing server.

In the digital contents service method, the identification of the terminal is one of an electronic serial number (ESN), a mobile identification number (MIN), and information separately assigned to each terminal.

In the digital contents management method, the identification of the terminal is separately assigned to each terminal.

According to the digital rights management method of the present invention, the DRM for the digital contents is dependent only on the permitted terminal (user), and the identification of the terminal (user) acts as the encryption/decryption key for the corresponding contents. Therefore, even though the terminal (user) that is not permitted obtains the copied or moved contents, a different identification from the original terminal (user) is used as the decryption key. In this manner, the illegitimate use of the digital contents can be prevented more efficiently.

Also, according to the digital rights management method of the present invention, since the encoding/decoding are performed using the identification of the permitted terminal (user), the DRM and the contents management can be achieved more conveniently, thereby reducing the burden of the related system.

In addition, according to the digital rights management method of the present invention, since the encoding/decoding are performed using the identification of the permitted terminal (user), the use of the corresponding digital contents is more convenient based on the correct billing.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

A digital rights management method of the present invention is based on the DRM encoding of the terminal for itself. That is, a contents server provides only digital contents and the terminal performs a DRM encoding of the acquired digital contents using an identification (ID) of the terminal. By encoding the digital content in this manner, the illegitimate use of the contents at other terminal can be fundamentally prevented.

Also, in a digital rights management method of the present invention, a server encodes digital contents using an ID of the terminal and the encoded contents are provided to the terminal. That is, the terminal requests the contents through a communication network. At this point, the ID of the terminal is transmitted together. The server performs a DRM encoding of the requested digital contents using the ID of the terminal, and transmits the DRM-encoded digital contents to the terminal through the communication network. By encoding the digital contents in this manner, the illegitimate use of the contents at other terminal can be fundamentally prevented.

Further, a digital contents service method includes: acquiring and storing the DRM-encoded contents using the ID of the terminal; connecting to the server and passing through user authentication, billing the use of the contents, and allowing the use of the billed contents. In this manner, the rights management function is improved. Here, the DRM process may be performed after the billing process.

The ID of the terminal may use an electronic serial number (ESN) and/or a mobile identification number (MIN). Also, the provider may separately assign the ID of the terminal to each terminal. The server may be a contents provider server, a contents service provider server, a billing server, or an integrated server thereof. The terminal may be a mobile terminal, for example a mobile phone.

Figure 1:
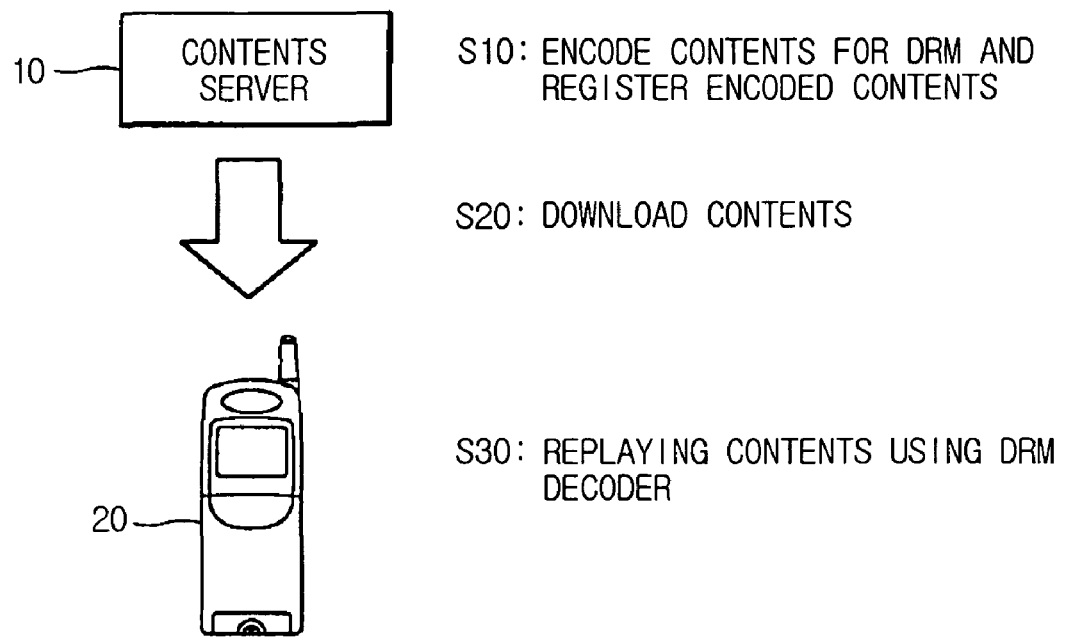
FIG. 1 is a view illustrating a DRM-based digital contents service method of a mobile terminal according to the related art.
Figure 2:
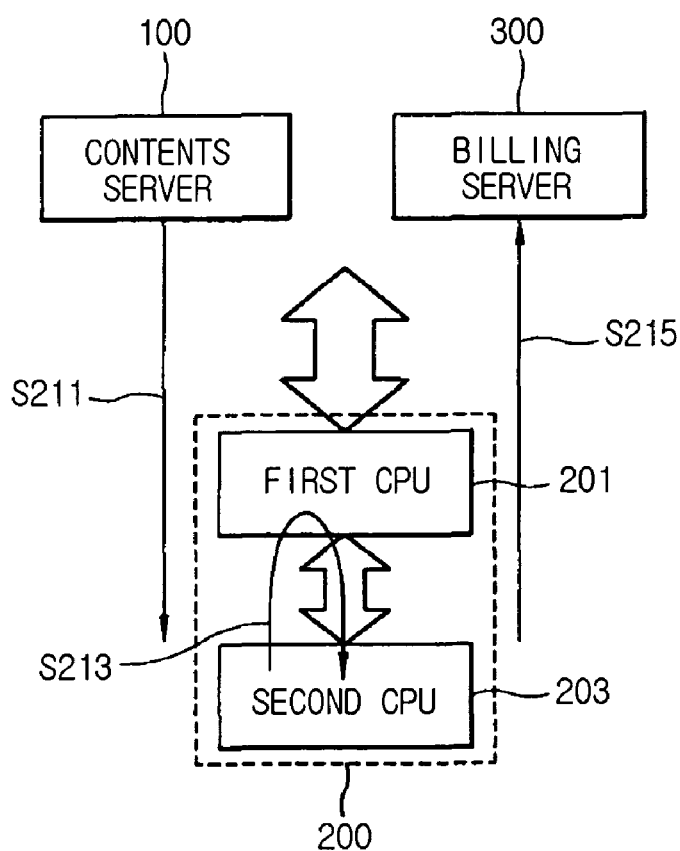
FIG. 2 is a view illustrating a digital contents service system according to an embodiment of the present invention.

FIG. 2 is a view illustrating a digital contents service system according to an embodiment of the present invention. The system includes a contents server 100 for providing digital contents, a terminal 200 for using the digital contents, and a billing server 300 for the billing according to the use of the digital contents. FIG. 2 exemplarily illustrates the case where two processors are mounted on the terminal 200. The first central processing unit (CPU) 201 is a main controller for controlling an overall operation of the mobile terminal, and the second CPU 203 is an auxiliary controller for controlling an operation of processing the multimedia contents.

When the mobile terminal 200 requests the downloading of the digital contents to the contents server 100, the server allows the mobile terminal 200 to download the requested digital contents based on the communication network (S211). The mobile terminal 200 encodes the downloaded digital contents using the ID of the terminal, and stores the encoded digital contents (S213) When using the stored digital contents, the corresponding digital contents are decoded using the ID of the terminal 200.

Also, when the mobile terminal 200 requests the downloading of the digital contents to the contents server 100, the ID of the mobile terminal 200 is transmitted to the contents server 100, and the contents server 100 encodes the requested digital contents using the ID of the terminal and allows the corresponding terminal 200 to download the digital contents (S211). The mobile terminal 200 stores the downloaded digital contents (S213). When using the stored digital contents, the corresponding digital contents are decoded using the ID of the terminal 200.

Since the billing process has to be achieved during the processes of encoding, storing, and using the digital contents, the terminal 200 connects to the billing system 300 through the communication network and performs the billing according to the use of the contents, the updating of necessary information, and so on (S215). The billing can be achieved before downloading the digital contents. Also, the billing can be achieved during the use of the downloaded contents.

The encoding of the digital contents is achieved by generating the encryption key. The decoding is also applied equally. The encryption key of the digital contents can be generated by the first CPU 201, and the billing process can be performed by the second CPU 203.

Generally, the use of the digital contents means the replaying of the digital contents. For this purpose, the mobile terminal 200 includes a storage unit, hardware and software for replaying the multimedia, and a display device.

Figure 3:
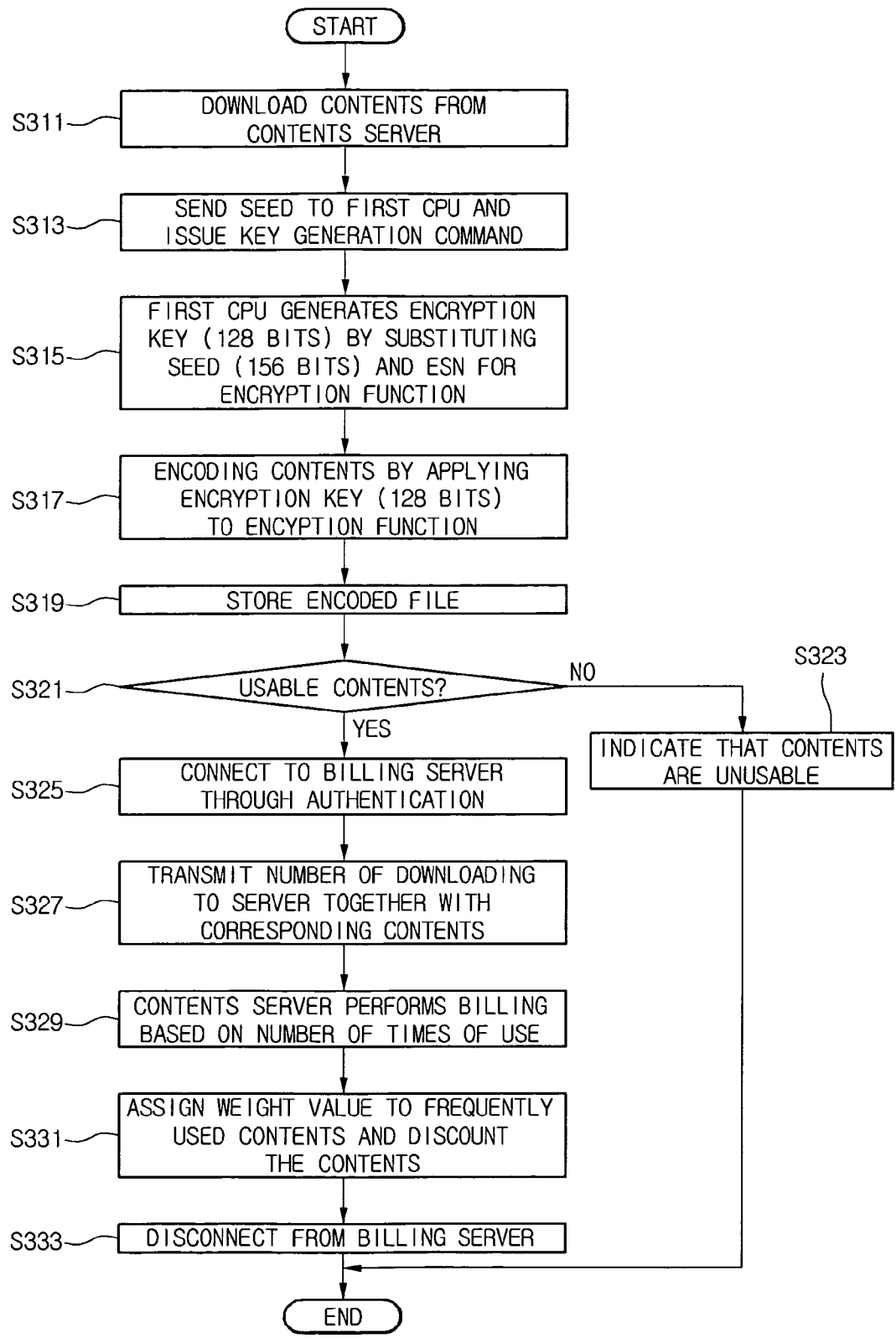
FIG. 3 is a flowchart illustrating a digital contents service method according to an embodiment of the present invention.

FIG. 3 is a flowchart illustrating a contents service method according to an embodiment of the present invention. Specifically, FIG. 3 illustrates the contents encoding process and the billing process when the terminal encodes the digital contents and stores the encoded digital contents. This method can also be applied to the case where the server encodes the digital contents by using the ID of the terminal provided from the terminal to the server and then provides the encoded digital contents to the terminal.

In FIG. 3, operations S311 to S319 are the contents encoding process, and operations S321 to S333 are the billing process. Here, the contents encoding process can be performed before the billing process.

When the mobile terminal 200 connects to the contents server 100 through the communication network and then selects digital contents to be downloaded, the contents server 100 allows the terminal 200 to download the digital contents selected by the user (S311).

The second CPU 203 of the mobile terminal 200 that downloads the digital contents transmits an encryption initialization code (that is, Seed) to the first CPU 201 and sends the encryption key generation command (S313). This process is performed for encoding the digital contents and means that the digital contents are encoded at the mobile terminal 200. The Seed can be expressed in 56 bits, and the encryption key can be expressed in 128 bits.

According to the encryption key generation command, the first CPU 201 can generate the encryption key by substituting the 56-bit Seed and the 32-bit ID of the terminal for an encryption generation function, which has an electronic serial number (ESN) and/or a mobile identification number (MIN) as parameter (S315). Also, specific information that a provider assigns in advance for identifying the terminal can be used.

The second CPU 203 encodes the digital contents by applying the encryption key to the encryption function (S317). Then, the encoded digital contents file is stored in the data storage unit (not shown) (S319).

As described above, FIG. 3 shows the digital rights management method in which the digital contents are downloaded and the terminal encodes the downloaded digital contents based on the ID of the terminal and then stores them. In another embodiment, a following rights management method can be also achieved. That is, when the terminal connects to the contents server and requests the downloading of the digital contents, the ID of the terminal, for example ESN or mobile identification number (MIN), is transmitted. The contents server encodes the corresponding digital contents using the ID of the terminal provided from the terminal, and transmits the encoded digital contents to the corresponding terminal. The terminal downloads the digital contents encoded based on the ID of the terminal and then stores them. That is, the terminal downloads the digital contents that the server encodes based on the ID of the terminal, and then stores the downloaded digital contents. According to the latter embodiment, the terminal downloads and stores the encoded digital contents without the process of encoding the digital contents.

Through the above-described processes, the digital contents are encoded based on the ID of the terminal and stored in the terminal. In order to use the encoded and stored digital contents, a following billing process has to be undergone.

First, it is determined whether the digital contents are available contents or not (S321). If the digital contents are not the contents that are downloaded to the mobile terminal 200 through the operations S311 to S319, they are not legitimate contents. Therefore, the second CPU 203 sends a message indicating that the corresponding contents are the unusable contents file.

However, if the contents are downloaded to the mobile terminal 200 through the legitimate path, the second CPU 203 determines the contents as the usable contents and the process proceeds to operation S325. The operation S325 is a process of connecting to the billing server 300 through authentication. When completing the user-terminal authentication, the terminal 200 transmits information (e.g., contents ID) of the corresponding contents to be used, number of the contents downloading, and information related to the use of the contents to the billing server 300 (S327).

Then, the contents server 100 performs the billing process (S329). For example, the proper billing is performed according to the billing related data, such as number of times of the use of the corresponding digital contents and information of the corresponding contents. Like in operation S331, the contents that are often used can be discounted by assigning a weight value. When the billing is completed, the second CPU is disconnected from the billing server 300 (S333).

Figure 4:
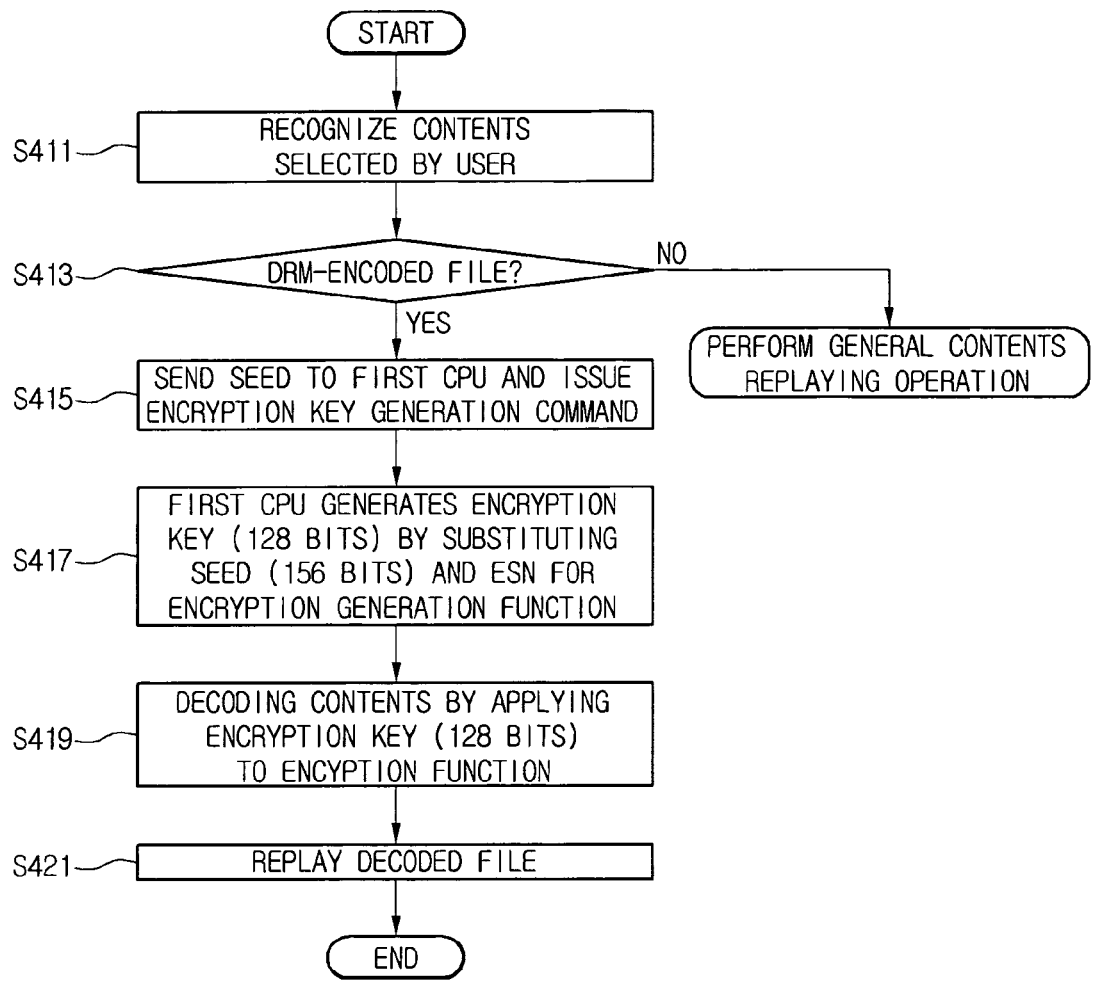
FIG. 4 is a flowchart illustrating a method of using digital contents according to an embodiment of the present invention.

A method of using the digital contents encoded based on the ID of the terminal will be described below with reference to FIG. 4. Specifically, a method of replaying the digital contents will be described below.

When the user selects the digital contents to be replayed in the mobile terminal 200, the second CPU 203 recognizes the selected contents (S411). The second CPU 203 determines whether the recognized digital contents are the contents file encoded for the DRM (S413). If the digital contents are not the contents file encoded for the DRM, the second CPU 203 recognizes the digital contents as general contents and performs an existing replaying operation of the general contents.

Meanwhile, if the digital contents are the contents file encoded for the DRM, the second CPU 203 transmits the encryption initialization code (Seed) to the first CPU 201 and issues the encryption key generation command (S415). This process is performed for replaying the contents encoded by the digital rights management method of the present invention. The first CPU 201 generates the 128-bit encryption key by substituting the 56-bit Seed and the ESN or MIN for an encryption generation function using them as parameter (S417). Then, the second CPU decodes the corresponding contents by applying the encryption key to the encryption function (S419). Then, the decoded contents are replayed (S421).

It will be apparent to those skilled in the art that various modifications and variations can be made in the present invention. Thus, it is intended that the present invention covers the modifications and variations of this invention provided they come within the scope of the appended claims and their equivalent.

What is claimed is:

1. A method for digital rights management in a mobile terminal, the method comprising:
    requesting, by the mobile terminal, a download of digital contents from a contents server;
    downloading the requested digital contents;
    generating, by the mobile terminal, an encryption key in response to an encryption key generation command using an identification of the mobile terminal and an encryption initialization code;
    encoding, by the mobile terminal, the downloaded digital contents using the generated encryption key;
    storing the encoded digital contents in the mobile terminal;
    determining, by the mobile terminal, that the stored encoded digital contents can be replayed;
    decoding, by the mobile terminal, the stored digital contents using the generated encryption key;
    performing, by the mobile terminal, a user-terminal authentication to connect to a billing server; and
    transmitting, from the mobile terminal to the billing server, information relating to use of the decoded digital contents used to perform a billing operation, wherein the transmitted information comprises a weight value assigned to each of the decoded digital contents.

2. The method according to claim 1, wherein the identification of the mobile terminal is an electronic serial number (ESN) of the mobile terminal.

3. The method according to claim 1, wherein the identification of the mobile terminal is a mobile identification number (MIN).

4. The method according to claim 1, wherein the identification of the mobile terminal is separately assigned to each of a plurality of mobile terminals.

5. The method according to claim 1, further comprising:
performing the billing operation using the stored encoded digital contents based on a communication with the billing server.

6. The method according to claim 5, wherein performing the billing operation using the stored encoded digital contents is based on the identification of the mobile terminal and identification of the stored encoded digital contents.

7. The method according to claim 1, wherein the encryption initialization code is represented in 56 bits, the identification of the mobile terminal is represented in 32 bits, and the generated encryption key is represented in 128 bits.

8. The method according to claim 5, wherein the billing operation comprises:
determining that the stored encoded digital contents are legitimate when the requested digital contents are downloaded through a legitimate path.

* * * * *